L. J. RICKARD.
WHEEL.
APPLICATION FILED JAN. 17, 1917.
1,236,362. Patented Aug. 7, 1917.
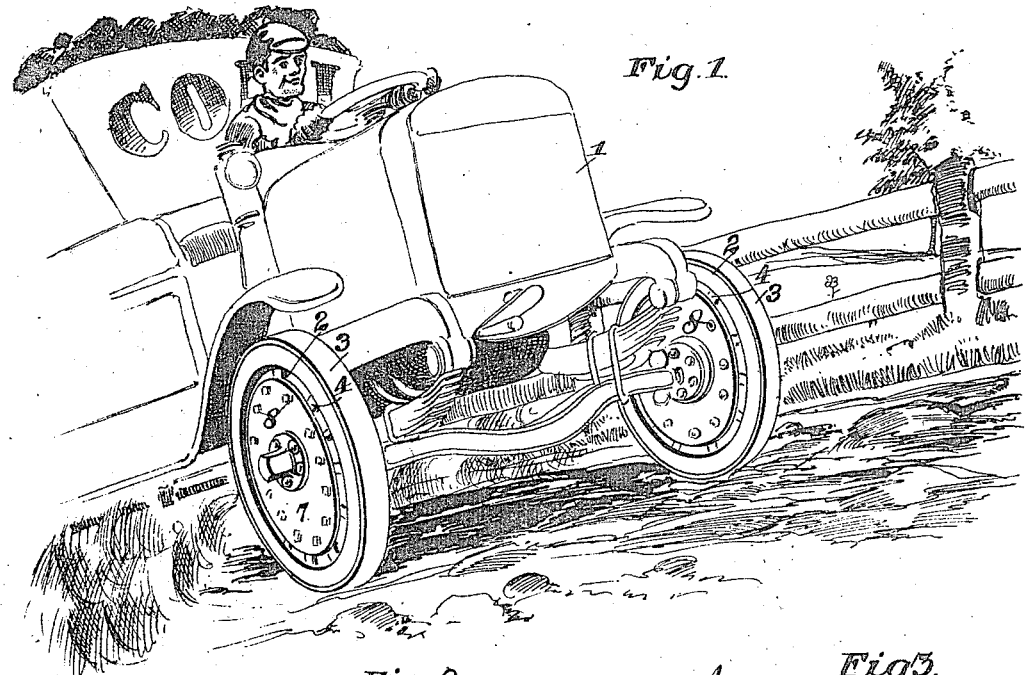
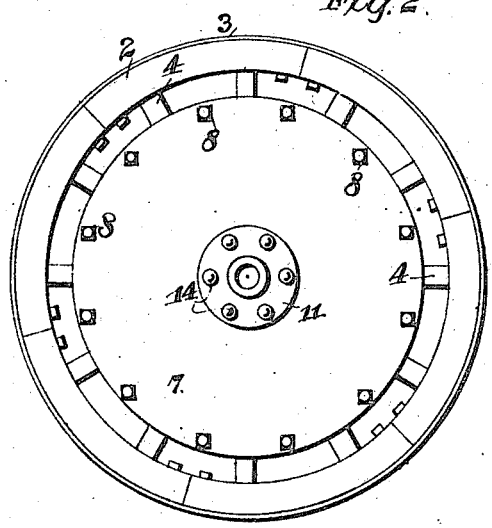
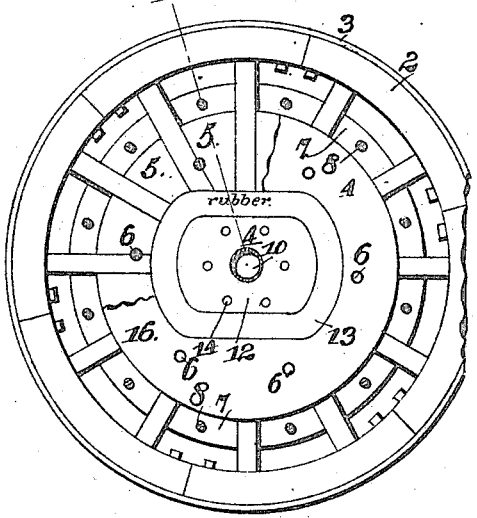
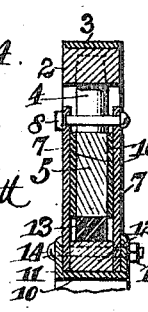
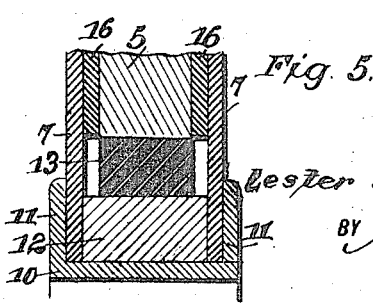
WITNESSES
John B. Schrott
W. E. Beck
INVENTOR
Lester J. Rickard
BY
ATTORNEYS

UNITED STATES PATENT OFFICE.

LESTER JOHN RICKARD, OF WALLA WALLA, WASHINGTON.

WHEEL.

1,236,362.

Specification of Letters Patent.

Patented Aug. 7, 1917.

Application filed January 17, 1917. Serial No. 142,808.

*To all whom it may concern:*

Be it known that I, LESTER J. RICKARD, a citizen of the United States, and a resident of Walla Walla, in the county of Walla Walla and State of Washington, have invented a certain new and useful Improvement in Wheels, of which the following is a specification.

My invention is an improvement in wheels, and has for its object to provide a wheel adapted especially for motor vehicle use, wherein the hub is independent of the wheel, and spaced apart from the wheel, the space being filled with a resilient material to cushion the hub against the wheel.

In the drawings:

Figure 1 is a perspective view of a motor vehicle provided with the improved wheel;

Fig. 2 is a side view of the wheel;

Fig. 3 is a similar view with the side plate removed and with parts broken away;

Fig. 4 is a section on the line 4—4 of Fig. 3, and

Fig. 5 is an enlarged detail of a portion of Fig. 4.

The present embodiment of the invention is shown in connection with a motor vehicle 1, a truck in the present instance, and the improved wheel comprises a felly 2 of usual construction, having a metal rim 3 and connected by spokes 4 to a filler 5. This filler is of wood or like suitable material, and consists of sections which are arranged between the spokes as shown, and are held in place by bolts 6 and facing plates 7. The bolts are passed through registering grooves in the adjacent edges of the spokes and filling blocks, as shown in Fig. 3, and the plates 7 which are circular are arranged on opposite sides of the wheel and are secured together between the spokes by means of bolts and nuts 8.

Within the wheel proper is provided an open space of oblong form, the said space having a long and a short axis at right angles to each other. The hub is arranged within this space, the said hub having an opening for receiving a spindle, and the hub is shaped to correspond with the shape of the space within the wheel. In the present instance the hub is formed by a bearing 10 having in each end a marginal flange 11, and the plates 7 are received within the said flanges as shown more particularly in Figs. 4 and 5.

A filler block 12 is arranged between the plates and between the flanges 11, the said filler block extending to near the peripheral edges of the flanges. The space between the blocks 5 and the filler block 12 is filled by a cushion 13 of rubber or other suitable resilient material, the said cushion being arranged directly between the filler block and the blocks 5.

Bolts 14 are passed through the flanges, the plates, and filler blocks 12, and these bolts are engaged by nuts 15 to hold the bolts in proper position. The sections of the filler 5 are faced with facing plates 16, in the form of rings which extend from the edge of the wheel to the periphery of the filler, that is, to the outer ends of the filling blocks. These plates are held in place by the bolts 6 before mentioned, and the said plates and bolts prevent outward movement of the sections.

It will be evident that when the rim of the wheel meets with shock or jar, this shock or jar will be absorbed by the rubber cushion 13, and will not be transmitted to the spindle and to the vehicle. The shape of the opening within the wheel and that of the hub is for the purpose of preventing angular movement of the hub with respect to the wheel, and for constraining the wheel and hub to turn together.

I claim:—

A wheel of the character specified, consisting of the felly, the rim and the spokes, and having a central oblong open space at the hub, filler sections arranged between the spokes to inclose the said space, and to brace and reinforce the spokes, and extending to near the felly and forming a continuous limiting wall for the said open space, holding plates for the filler blocks and the spokes at opposite faces of the wheel and secured to each other and to the spokes and blocks, said plates being flush with the outer edges of the filler blocks and with the limiting wall of the open space, a hub of oblong form and of less size than the space and arranged within the said space, a cushion of solid rubber within the said space between the limiting wall thereof and the hub, and facing plates on opposite sides of the wheel and hub and extending beyond the filler blocks, and a connection between the filler blocks and the felly and between the spokes.

LESTER JOHN RICKARD.